United States Patent [19]

Eslinger et al.

[11] 4,221,624

[45] Sep. 9, 1980

[54] METHOD OF MANUFACTURING A FOAMED CORE THERMOPLASTIC SHEET

[76] Inventors: Haynes L. Eslinger, 1444 S. Tyler Rd., Wichita, Kans. 67209; James A. Payne, Wichita, Kans.

[21] Appl. No.: 892,520

[22] Filed: Apr. 3, 1978
(Under 37 CFR 1.47)

[51] Int. Cl.² ............ B29C 27/14; B29D 27/00; B29F 3/04
[52] U.S. Cl. ............ 156/243; 156/244.11; 264/45.9; 264/148; 264/171; 428/305; 428/315
[58] Field of Search ......... 264/45.9, 46.1, 148, 264/171; 156/244.11, 244.12, 244.18, 244.22, 243; 428/305, 315

[56] References Cited

U.S. PATENT DOCUMENTS

| | | | |
|---|---|---|---|
| 3,317,363 | 5/1967 | Weber | 156/244.22 X |
| 3,331,900 | 7/1967 | Thomas | 264/46.1 |
| 3,398,035 | 8/1968 | Cleereman et al. | 156/244.12 X |
| 3,557,265 | 1/1971 | Chisholm et al. | 264/46.1 |
| 3,855,376 | 12/1974 | Ono et al. | 264/46.1 |
| 3,956,438 | 5/1976 | Schippers | 264/46.1 |
| 3,957,940 | 5/1976 | Schubert et al. | 156/244.11 X |
| 4,067,949 | 1/1978 | Karabedian | 264/45.9 X |
| 4,076,570 | 2/1978 | Medley et al. | 156/244.11 |

FOREIGN PATENT DOCUMENTS 2732866 1/1978 Fed. Rep. of Germany .......... 264/45.9

OTHER PUBLICATIONS

Bernhardt, Ernest C. Edt., "Processing of Thermoplastic Materials," New York, Reinhold, ©1959, pp. 154-158, (SPE Plastics Engineering Series).

Primary Examiner—Philip Anderson
Attorney, Agent, or Firm—John H. Widdowson

[57] ABSTRACT

A method of manufacturing thermoplastic sheet products. The product produced from the method consisting of at least three layers with the inner layer being a foamed core. The product having significant cost and weight reduction and improved performance properties over solid sheet products currently being produced by standard industry practices.

4 Claims, 5 Drawing Figures

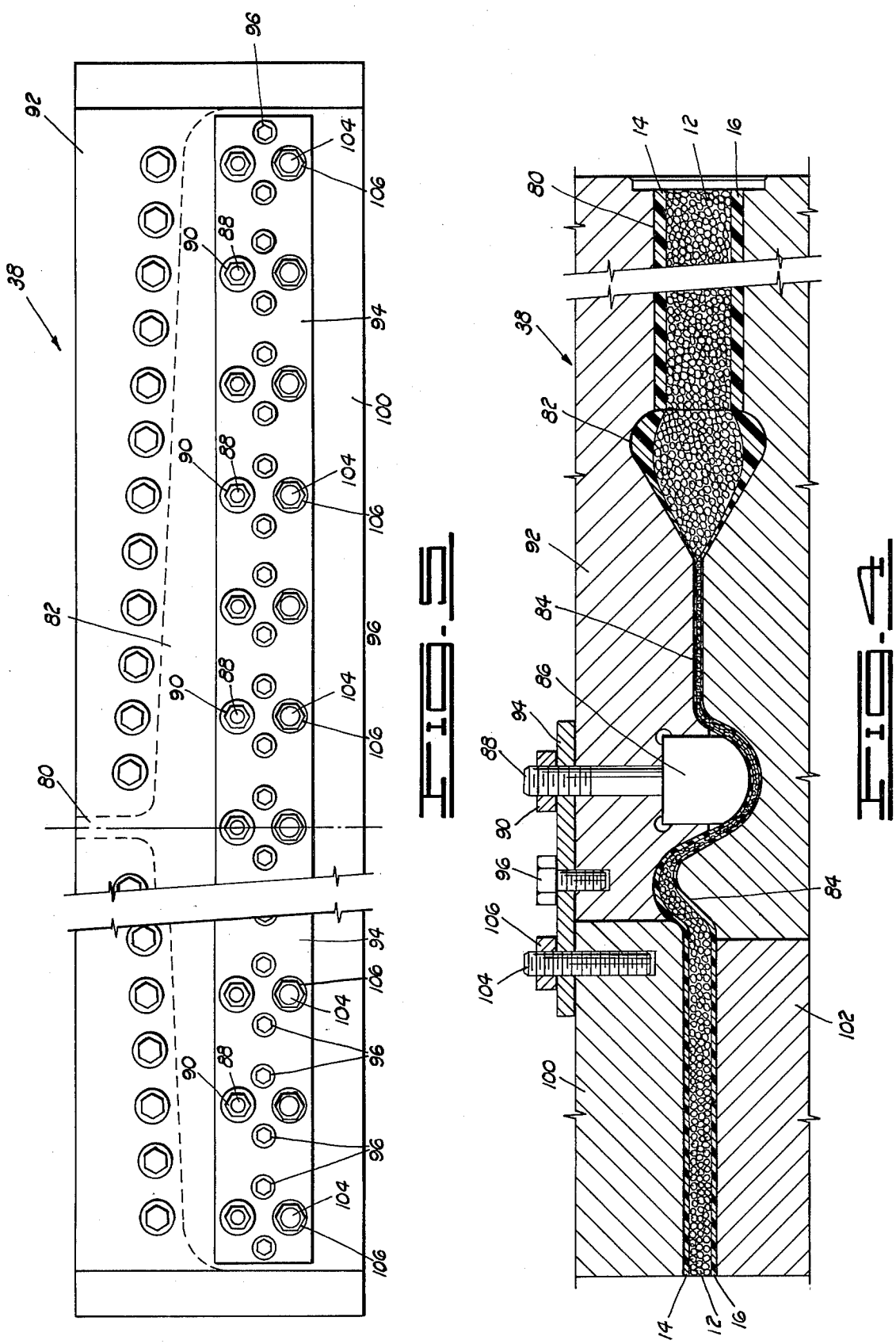

METHOD OF MANUFACTURING A FOAMED CORE THERMOPLASTIC SHEET

BACKGROUND OF THE INVENTION

This invention relates generally to a method of manufacturing thermoplastic sheet and more particularly, but not by way of limitation, to a thermoplastic sheet with a foamed core and two or more solid outer thermoplastic skins.

Heretofore, solid thermoplastic sheet products made out of ABS polystyrene, polyethylene, poly vinyl chloride sheet products, or the like, have been standard in the industry. The incorporation of blowing agents into the thermoplastic materials for gravity reduction is old in the art. In injection molding and other converting processes, it has been a common practice to use blowing agents in the thermoplastic material for achieving either cost reduction, weight reduction, or other special functions like the elimination of molding sinks, etc.

In extrusion processes, various methods have used blowing agents for producing special foamed products such as foamed styrene for egg carton sheets, wood simulation, etc.

The problems with using blowing agents in thermoplastic materials for producing extruded sheet products have been providing adequate surface appearance and the physical properties of the foam plastic sheet has not met the necessary requirements when compared to solid thermoplastic sheet for engineering applications.

The co-extrusion of thermoplastic sheets having solid outer skins with a foamed core has offered a real potential for overcoming the problem of surface appearance of the sheet and providing the necessary impact properties required of the end product.

In U.S. Pat. No. 3,855,376 to Ono et al, a process for making structural material having a foamed inner core is disclosed. In this process, flat surface layers consisting of molten resins and an inner layer consisting of a molten resin having a blowing agent therein are introduced through separate entrances in a sheet-forming die. The surface layers and the inner layer are joined in the die without mixing the layers together. Pressure is applied to the layers to shape the surfaces smooth prior to discharging the formed sheet from the die wherein the pressure is removed and the inner layer resin is allowed to foam. This invention requires the use of an expensive die for receiving separate layers of the molten resin along with the maintenance problem of having to continuously and for each layer adjust the overall width of the die which in practice varies typically from 50 inches to 120 inches so that the required thickness of the sheet is achieved.

There are additional methods of forming multiple layer plastic sheets, tubing, conduits, or the like and in particular U.S. Pat. No. 3,773,877 to Baker et al, U.S. Pat. No. 3,857,914 to Aishima et al, and U.S. Pat. No. 3,476,627 to Squires. The subject invention is distinguishable over these patents, and the patent to Ono et al and provides an economical method of forming a thermoplastic sheet with solid skins and a foamed core.

SUMMARY OF THE INVENTION

The product obtained from the method of making a thermoplastic sheet with foamed core reduces the weight of a similar dimensioned solid sheet by up to 40 percent. The product also reduces the cost as compared to a solid plastic sheet by up to 35 percent.

Because of the make up of the thermoplastic sheet with foamed core, the product improves cycle time during vacuum forming by up to 40 percent when compared to solid sheet of similar dimensions. This improved cycle time is due to the reduced time in having to heat the product in preparation for the vacuum forming.

The sandwich-like construction of the thermoplastic sheet with a foamed core allows for the fabrication of sheets that offer increased part stiffness when compared to a similar solid thermoplastic sheet of equivalent cost and weight.

The subject invention forms a multi-layer thermoplastic sheet with foamed core in a feedblock prior to introducing the combination of molten streams of thermoplastic resin into a sheet die thereby eliminating the need of introducing individual sheets into the die and forming the multi-layer sheet in the die. By not forming the multi-layer sheet in the die, the cost of providing a die for receiving multi-layer sheets is eliminated and adjusting for variations in width and thickness of the layers become commercially feasible.

Also, by forming the multi-layer thermoplastic sheet with foamed core in the feedblock in a more molten state, an interface is formed wherein there is a matrix mix between the foamed core and the outer thermoplastic skins. The matrix mix interface insures against skin separation from the inner core.

The steps of the subject method include the introduction of a molten stream of thermoplastic resin with a blowing agent blended therein into a feedblock mounted at the end of a main extruder. A second molten stream of thermoplastic resin is introduced into the feedblock from a co-extruder. In the feedblock, the second molten stream is split equally forming a third stream of thermoplastic resin. The second molten stream is introduced on the top of the first stream. The third stream is introduced on the bottom of the first stream. The first, second, and third streams are then discharged from the feedblock where they are fed in combination into a sheet die for forming the thermoplastic resin into a flat thermoplastic sheet with a foamed inner core surrounded by solid outer skins.

The advantages and objects of the invention will become evident from the following detailed description when read in conjunction with the accompanying drawings which illustrate the preferred embodiments of the invention.

BRIEF DESCRIPTION OF THE DRAWINGS

FIG. 4 is a sectional view of the sheet die.

FIG. 5 is a top view of the sheet die.

DETAILED DESCRIPTION OF THE DRAWINGS

Figure 1:
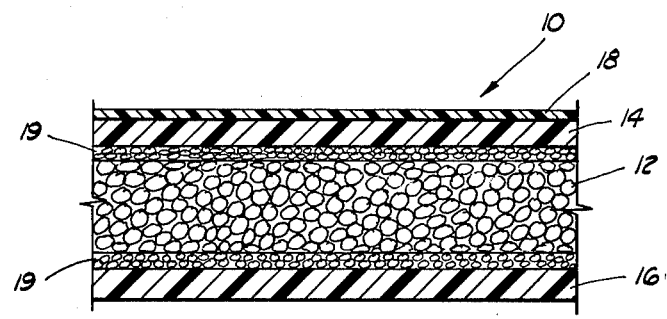
FIG. 1 is a sectional view of the thermoplastic sheet with the foamed core.

In FIG. 1, the thermoplastic sheet with foamed core is designated by general reference numeral 10. The sheet 10 is shown in a partial side sectional view having a foamed thermoplastic core 12, an upper solid thermoplastic skin 14, a lower solid thermoplastic skin 16, and an acrylic film 18 which is laminated to the upper skin 14 for providing the sheet 10 with outdoor weather resistance. A matrix mix interface 19 is shown between the top and bottom of the core 12 and skins 14 and 16. The interface 19 is formed when the core 12 and skins 14 and 16 are joined together in a molten state in the feedblock and provides an integrally formed bond to prevent separation of the sheet 10.

Typical dimensions of the sheet 10 are 30–120 inches wide by any length and from 0.130 to 0.750 inches thick. For example, a typical thickness of the sheet 10 would be 0.127 inches foamed core, 0.05 inches for the solid skins 14 and 16, and 0.003 inches acrylic film. It should be noted that the acrylic film 18 is an addition to the subject invention and is added to the sheet 10 by way of the roll stack shown in FIG. 2. The acrylic film 18 may or may not be added to the sheet 10 depending on the customer's requirements and the end use of the product.

Figure 2:
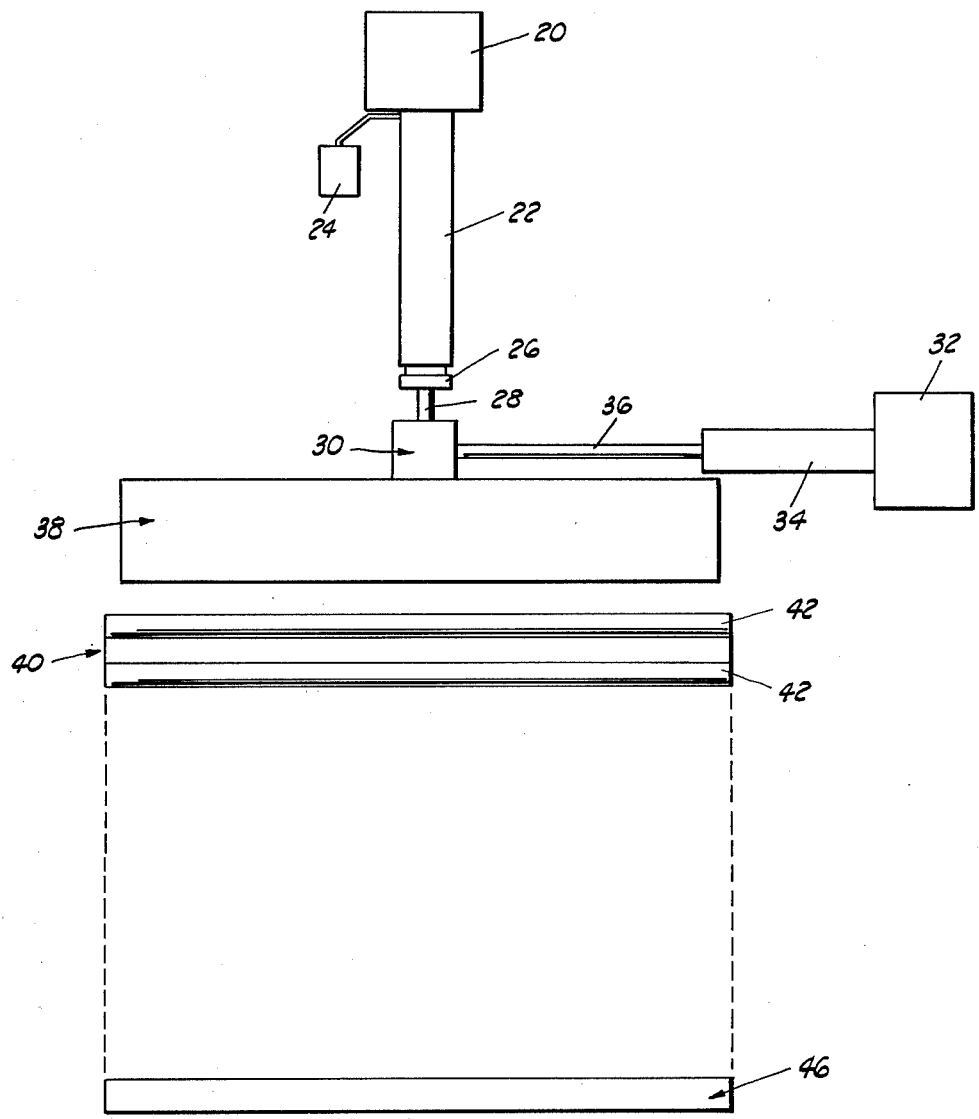
FIG. 2 is a top view of the equipment used in producing the thermoplastic sheet with foamed core.

In FIG. 2, the typical equipment used in the extrusion process of manufacturing the sheet 10 is illustrated. A dryer/hopper 20 is mounted in front of a main extruder 22 for feeding the plastic resin material therein. The plastic material may be ABS, PS, PE, PVC, or any similar types of resins used in the extrusion of thermoplastic sheets. Adjacent the main extruder 22 and in communication therewith is an additive pump 24 for feeding a liquid blowing agent into the thermoplastic resin formed in the main extruder 22. The blowing agent may be azodicarbonamide or any other thermally decomposable blowing agent. The blowing agent is used in a liquid form and metered from the pump 24 directly into the barrel of the main extruder 22 or just above the feed throat of the main extruder 22. The feed throat is not shown in the drawings. By carefully controlling the amount of the blowing agent introduced from the pump 24 to the thermoplastic resin in the main extruder 22, and by temperature control of the thermoplastic melt, gravity reductions of the foamed core 12 may range from as little as 5% to as much as 50%.

The thermoplastic resin with the blowing agent therein is discharged from the main extruder 22 through a screen changer 26 which acts as a filter for screening contaminants in the resin. The screen changer 26 may or may not be used depending on whether the plastic material is virgin material or recycled material which heretofore has been waste material which is subject to contamination. From the screen changer 26, the molten resin is fed through a transition tube 28 into a feedblock 30.

To the side of the feedblock 30 is a second dryer/hopper 32 which feeds plastic resins into a co-extruder 34 which in turn feeds solid molten thermoplastic resin through a second transition tube 36 into the side of the feedblock 30. The co-extruder 34 in this case does not include a screen changer since virgin plastic material is used for feeding into the co-extruder 34. The reason why virgin plastic material is used in the co-extruder is the thermoplastic resin from the co-extruder ultimately forms the outer skins 14 and 16 of the sheet 10 and surface appearance of the sheet 10 is critical, and a contaminated recycled plastic is generally not used because of the potential in blemishing the outer skins 14 and 16.

It should be mentioned that the feedblock 30 is rather new to the plastic extrusion industry and is made and licensed by two well-known companies. The feedblock 30 provides for the introduction of molten streams of thermoplastic resin from the main extruder 22 and a co-extruder 34 and allows these molten streams to be split in the feedblock 30 thereby forming a plurality of individual streams. The streams are fed, one on top of the other, and discharged outwardly into a sheet die 38. The feedblock 30 is instrumental in bringing about the subject method invention and eliminating the use of the sheet die 38 for receiving separate thermoplastic sheets so that a multi-layer thermoplastic sheet such as sheet 10 may be formed.

From the sheet die 38, where the thermoplastic resin is formed into a desired width and thickness, the sheet 10 is discharged into a roll stack 40 positioned vertically. The sheet 10 is fed through a series of individual rolls 42 in the roll stack 40 and then fed onto take-off equipment (not shown) and through a shear 46 which cuts the sheet 10 to the proper length.

As the sheet 10 is fed through the rolls 42 of the roll stack 40, the acrylic film 18 is introduced and fed onto the top of the upper skin 14 and laminated thereto as it passes through the rolls 42. As mentioned above, the acrylic film 18 may or may not be added to the sheet 10 depending on the customer's requirements.

Figure 3:
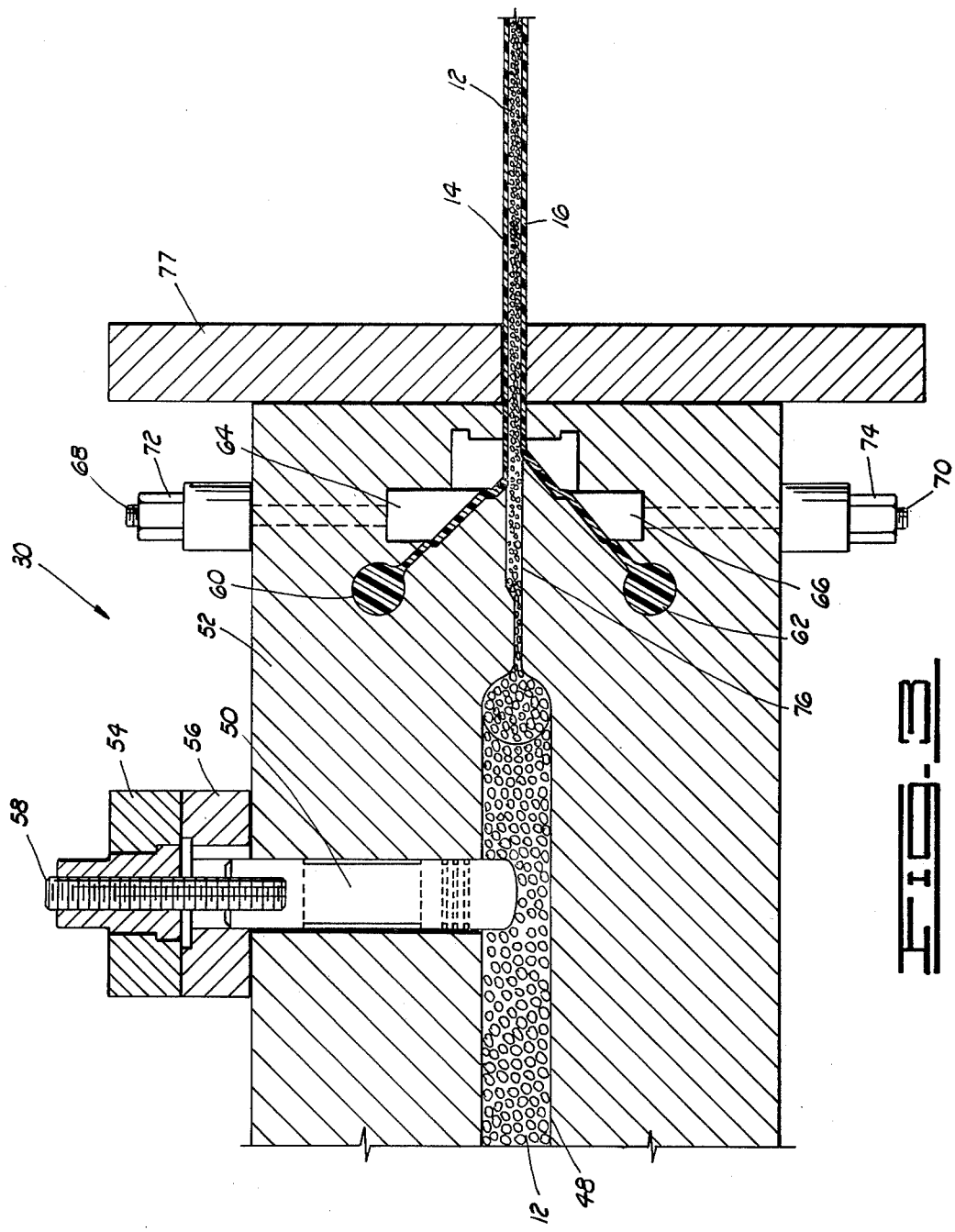
FIG. 3 is a sectional view of the feedblock.

In FIG. 3, a cross section of a standard three-layer feedblock 30 is illustrated. The feedback 30 includes a main intake port 48 for receiving the molten thermoplastic resin with blowing agent which ultimately becomes the foamed core 12. The foamed core 12 feed rate is controlled by a restricter bar 50 mounted on top of a feedblock housing 52. The restricter bar 50 includes a pair of threaded adjusting nuts 54 and 56 attached to a threaded bolt 58 connected to the restricter bar 50. By raising and lowering the restricter bar 50 in the main intake port 48, the flow of the foamed core 12 is controlled. The solid thermoplastic resin extruded from the co-extruder 34 into the feedblock 30 is split equally in the feedblock housing 52 and introduced into a second intake port 60 and a third intake port 62. The thickness and the flow of the solid thermoplastic resin which ultimately forms the upper skin 14 and outer skin 16 is controlled by an upper restricter bar 64 and a lower restricter bar 66 which are connected to threaded bolts 68 and 70. The upper restricter bar 64 and lower restricter bar 66 are adjusted by adjusting threaded nuts 72 and 74 on the threaded bolts 68 and 70.

Also in FIG. 3, the foamed core 12 can be seen discharged into a discharge port 76 wherein the solid thermoplastic resins are introduced from the second intake port 60 and third intake port 62 thereby forming the upper skin 14 and lower skin 16 surrounding the foamed core 12. A round adapter plate 77 attached to the housing 52 is used for securing the feedblock 30 to the sheet die 38.

In FIG. 4, a partial cross sectional view of the sheet die 38 is illustrated. From the feedblock 30, the three streams of molten resin are discharged into an intake port 80 of the sheet die 38. When the molten streams are received through the intake port 80, they are spread outwardly in a tear-drop spreader section 82 across the width of the sheet die 38. A typical standard sheet die may be 50 inches or 120 inches depending on the width of the sheet 10 desired. From the tear-drop spreader section 82, the molten streams are compressed through a discharge port 84. As the molten resins flow through the discharge port 84, the thickness of the sheet 12 is controlled by a restricter bar 86 which may be adjusted upwardly and downwardly by an attached threaded bolt 88 mounted to an adjusting nut 90. The restricter bar 86 extends along the length of the die 38 and is adjusted by a plurality of threaded bolts 88 attached to adjusting nuts 90 shown in FIG. 5. The threaded bolts 88 and restricter bar 86 are attached to a die housing 92 by an elongated cap plate 94 attached to the housing 92 by a plurality of threaded bolts 96. From the discharge port 84, the molten resin stream flows between a pair of die lips 100 and 102 which are used to regulate the finished thickness of the sheet 10. The die lip 100 is adjusted by a threaded bolt 104 and adjusting nut 106 attached to the plate 94.

FIG. 5 illustrates a top view of the sheet die 38 with the intake port 80 and tear-drop spreader section 82 shown in dotted lines. Also a top view of the cap plate 94 is shown.

In operation, the method of manufacturing a thermoplastic sheet with a foam core is practiced as follows. The dryer/hopper 20 and 32 are loaded with dry thermoplastic pellets. If it is desired, the hopper 20 may be supplied with reground, recycled thermoplastic material. Using the example where it is desired to produce a foam core sheet 10 having a finished thickness of 0.230 inches, the die lips 100 and 102 are set at 0.227 inches. The roll gap between the rolls 42 of the roll stack 40 are set at 0.089 inches. The main extruder 22 is started with the rpm raised to approximately 30 rpm's. The main extruder 22 is filled and leveled to 0.089 inches gauge. The roll gap between the rolls 42 is then open to 0.189 inches gauge. The co-extruder 32 is started and raised to an rpm level required to fill and level the co-extruder 34 to a gauge of 0.189 inches. The roll gap is then increased to 0.227 inches.

At this point, the additive pump 24 is started with the liquid blowing agent fed into the main extruder 22 at approximately 0.25 parts per 100 parts of the thermoplastic resin by weight. The main extruder 22 is then checked for proper temperature control which normally ranges from 325 degrees to 450 degrees F. The co-extruder 34 will have approximately the same operating temperatures. The roll gap between the rolls 42 and 43 is now set at 0.230 inches and as the sheet 10 begins to flow from the feedblock 30 through the sheet die 34, the acrylic film 18 is introduced from above the roll stack 40 where it is laminated to the top of the upper skin 14 and the finished thermoplastic sheet 10 is produced and properly dimensioned as it passes through the shear 46. While it is not shown in the drawings, side slitters may be used in conjunction with the take-off equipment 44 for cutting a desired width of the finished sheet 10.

Changes may be made in the construction and arrangement of the parts or elements of the embodiment as disclosed herein without departing from the spirit or scope of the invention as defined in the following claims.

We claim:

1. A method of forming a thermoplastic sheet having a sandwich construction of a foamed thermoplastic core with outer solid thermoplastic skins, the steps comprising:
   (a) introducing a blowing agent into a stream of thermoplastic resin in a first plastic extruder;
   (b) extruding the stream of thermoplastic resin with the blowing agent blended therein;
   (c) filtering the extruded stream of step (b) and discharging the filtered stream into a feedblock;
   (d) introducing a virgin extruded molten stream of thermoplastic resin into the feedblock of step (c);
   (e) splitting equally in the feedblock the virgin molten stream of step (d) thereby forming a first virgin stream of thermoplastic resin and a second virgin stream of thermoplastic resin;
   (f) introducing the first virgin stream of step (e) on top of the filtered stream of step (c);
   (g) introducing the second virgin stream of step (e) on the bottom of the filtered stream of step (c);
   (h) discharging the combination of the first virgin stream, the second virgin stream, and the filtered stream from the feedblock into a sheet die of a defined thickness;
   (i) tear drop spreading the discharged combination of step (h) while in said sheet die to a thickness greater than said defined thickness of step (h); and
   (j) compressing thereafter said spread combination of step (i) while in said die to a thickness less than said defined thickness of step (h).

2. The method of claim 1 additionally including controlling the flow of said tear dropped combination by restricting control means subsequent to said tear dropping.

3. The method of claim 2 further including discharging the combination from the die and feeding the same into a roll stack and introducing an acrylic film on the top of said combination as it is fed through the roll stack and laminating it to said combination.

4. The method of claim 3 additionally including feeding the thermoplastic sheet through a shear where the sheet is cut to dimension.

* * * * *